(12) United States Patent
Park

(10) Patent No.: US 11,629,688 B2
(45) Date of Patent: Apr. 18, 2023

(54) HYDROELECTRIC POWER GENERATION SYSTEM

(71) Applicant: Jung Keuk Park, Seoul (KR)

(72) Inventor: Jung Keuk Park, Seoul (KR)

(*) Notice: Subject to any disclaimer, the term of this patent is extended or adjusted under 35 U.S.C. 154(b) by 0 days.

(21) Appl. No.: 17/609,983

(22) PCT Filed: May 7, 2020

(86) PCT No.: PCT/KR2020/006033
§ 371 (c)(1),
(2) Date: Nov. 9, 2021

(87) PCT Pub. No.: WO2020/231082
PCT Pub. Date: Nov. 19, 2020

(65) Prior Publication Data
US 2022/0205422 A1    Jun. 30, 2022

(30) Foreign Application Priority Data

May 10, 2019  (KR) .................. 10-2019-0055199

(51) Int. Cl.
*F03B 17/06* (2006.01)
*F03B 7/00* (2006.01)
*H02K 7/18* (2006.01)

(52) U.S. Cl.
CPC .............. *F03B 17/06* (2013.01); *F03B 7/006* (2013.01); *F05B 2220/32* (2013.01); *F05B 2220/706* (2013.01); *F05B 2260/4031* (2013.01); *F05B 2260/505* (2013.01); *H02K 7/1823* (2013.01)

(58) Field of Classification Search
CPC ...... F03B 17/06; F03B 7/006; F05B 2220/32; F05B 2220/706; F05B 2260/4031; F05B 2260/505; H02K 7/1823
See application file for complete search history.

(56) References Cited

U.S. PATENT DOCUMENTS

2017/0107967 A1    4/2017   Kasten
2021/0332785 A1*  10/2021   Coleman ................. F03B 7/006

FOREIGN PATENT DOCUMENTS

| JP | 2011163247 A | 8/2011 |
| KR | 200451501 Y1 | 12/2010 |
| KR | 1020130016501 | 2/2013 |
| KR | 101445159 B1 | 9/2014 |
| KR | 101830110 B1 | 2/2018 |

* cited by examiner

*Primary Examiner* — Viet P Nguyen
(74) *Attorney, Agent, or Firm* — Kirton McConkie; Evan R. Witt

(57) ABSTRACT

The disclosed hydroelectric power generation system includes a waterwheel rotated by falling water having multiple curved portions. Multiple circular members each having a cover are loaded in a corresponding one of the multiple curved portions, elevated with the cover in an open position to empty the circular member, filled with water upon reaching a top dead point thereof, and allowed to fall freely with the cover in a closed position. The cover of the circular members are automatically opened and closed. A track extends downwardly from a point at which the curved portion of the waterwheel is turned into a downwardly inclined position. The track guides the circular member to move by gravity along the track. A feed track allows the circular members to be supplied back to respective curved portions during rotation of the waterwheel. An output shaft of a gear train drives a generator.

6 Claims, 9 Drawing Sheets

HYDROELECTRIC POWER GENERATION SYSTEM

TECHNICAL FIELD

The present invention relates to a hydroelectric power generation system, and more particularly to a hydroelectric power generation system which produces electricity through a process including: loading a circular member into a corresponding one of multiple curved portions formed at predetermined intervals on an outer circumferential surface of a waterwheel; filling the circular member with water immediately before the circular member falls onto a track; rotating a latch using the circular member falling freely along the track under acceleration due to gravity; removing water from the circular member to lighten the circular member; and supplying the circular member back to the curved portion of the waterwheel.

BACKGROUND ART

In general, Korea uses thermal power (anthracite), hydropower, tidal power, nuclear power, and the like, as sources of energy, and is an energy resource poor country despite development of alternative energy.

For example, it is reported that Korea possesses about 1.5 billion tons of anthracite (based on a calorific value of more than 3,000 kcal). However, available reserves of anthracite are only about 700 million tons (70% of which is stored in Yeongwol and Jeongseon, Gangwon-do), and anthracite production has sharply decreased after reaching 24 million tons in 1988 with changes in household fuels/heating methods. Further, anthracite has a relatively low calorific value and is unsuitable for industrial use or power generation.

In addition, although available hydroelectric potential, including pumped-storage hydroelectricity is about 6 million kW, 3,093,000 kW or more has already been exploited and remaining hydroelectric potential is estimated to be about 2.89 million kW (below the amount of electricity produced by three nuclear power plants).

Available tidal energy is estimated to be 1.7 million kW across some areas of the west coast of Korea. However, tidal power generation has drawbacks of low capacity and low economic feasibility.

Nuclear power generation in Korea relies on imports for fuels thereof. In addition, although Korea possesses 50,000 tons of uranium in Okcheon and so on, this uranium is a low-grade mineral containing 0.03% uranium-235 and is not economically feasible yet.

Korea has no oil and bituminous coal reserves or has no identified oil and bituminous coal reserves. In addition, although natural gas deposits are estimated to lie in coastal waters of Korea, the amount, size, and economic feasibility thereof are uncertain.

Therefore, a lot of research and development has gone into alternative energy.

A conventional power generation apparatus using a waterwheel is disclosed KR Patent Registration No. 10-1445159.

FIG. 1 is a perspective view of a conventional rotary power generation apparatus using a waterwheel and FIG. 2 is a front view of the conventional rotary power generation apparatus using the waterwheel. The rotary power generation apparatus A1 includes: a waterwheel 2 disposed near a sluice gate 100 and partially submerged in water to be rotated by a flow of water; a gearbox 4 multiplying the torque generated by the waterwheel 2; and a generator 6 connected to the gearbox 4 and converting rotational energy into electricity.

Further, the rotary power generation apparatus includes: an auxiliary drive unit 8 supplementing the torque of the gearbox 4 for stable power generation; and a controller 10 controlling operation of the generator 6 and operation of the auxiliary drive unit.

The waterwheel includes a rotary wheel 22 having multiple chambers 23 continuously arranged in a circumferential direction of the rotary wheel, separated from one another by multiple partitions, and receiving water therein; and a shaft 24 coupled to the center of the rotary wheel 22. Accordingly, the waterwheel is rotated by flowing water.

The rotating shaft 24 having two opposite ends coupled to mounts 3 disposed on opposite sides of a river through a bearing, and one of the mounts 3 is provided with the gearbox 4.

The chamber 23 of the rotary wheel 22 is open at a top thereof and has a bottom surface formed with a through-hole 232 to be partially open.

Accordingly, as the chamber 23 filled with water is elevated by rotation of the rotary wheel, some portion of the water is gradually discharged from the chamber, thereby ensuring stable rotation of the rotary wheel.

The gearbox 4 includes a main driving gear 40 connected to the shaft 24 of the waterwheel 2 and multiple driven gears 42 coupled to the main driving gear 40 to be rotated by the main driving gear 40.

The main driving gear 40 and the multiple driven gears 42 are implemented as spur gears, which can be meshed with one another through tooth-to-tooth engagement.

In addition, the multiple driven gears 42 have gradually smaller diameters toward the last gear stage.

The generator 6 is connected to a first driven gear 421 among the multiple driven gears 42, which is connected to the main gear 40, and is rotated in conjunction with the first driven gear to produce electricity.

That is, since a rotor (not shown) of the generator 6 is connected to a shaft 421-2 of the first driven gear 421, electricity is generated as the rotor is rotated in conjunction with rotation of the first driven gear 421.

The auxiliary drive unit 8 includes an inverter motor 82 connected to a driven gear 425 on the last gear stage, among the multiple driven gears of the gearbox 4, and driving the driven gear 425 on the last gear stage under a certain condition to provide auxiliary power for driving the generator 6.

That is, the auxiliary drive unit 8 includes: a coupling 83 coupled to a shaft 821 of the inverter motor 82 to be selectively connected to or disconnected from the shaft 821; a pulley shaft 84 coupled to the driven gear 425 on the last gear stage; a pulley 86 formed on the pulley shaft 84; and a chain 88 having one end coupled to a shaft of the coupling 83 and the other end coupled to the pulley 86 to transmit the torque of the shaft of the inverter motor 82 to the pulley shaft 84.

The controller 10 selectively controls opening/closing of the sluice gate 100 and operation of the generator 6 and the auxiliary drive unit 8, thereby ensuring smooth power generation.

When the waterwheel 2 is rotated at normal speed, the generator 6 is driven to produce electricity without operation of the auxiliary drive unit 8, whereas, when the waterwheel 2 is rotated at an insufficient speed, the auxiliary drive unit 8 is operated to supplement the torque of the generator 6, thereby ensuring continuous electricity generation.

RELATED LITERATURE

<Patent Document 0001> Korean Patent Registration No. 10-1445159 (registration date: Sep. 22, 2014)

DISCLOSURE

Technical Problem

However, such a conventional power generation apparatus has several problems as follows:

First, since the power generation apparatus produces electricity using rotation of a waterwheel by water flowing along a water channel, the power generation apparatus suffers from a major drawback of inability to produce electric power when the velocity of flowing water is low.

Second, due to low rotational speed of the waterwheel, a separate auxiliary drive unit and controller are required to supplement the torque of a gearbox, causing great expense of installation.

Embodiments of the present invention are conceived to solve such a problem in the art and are aimed at providing a hydroelectric power generation system which produces electricity using circular members transferred by a waterwheel rotated by falling water, the circular members continuously rotating a latch while circulating along a track such that a driving sprocket is rotated by a chain connected to the latch, wherein, when the circular members are sequentially loaded in respective curved portions of the waterwheel and are elevated, the circular members are empty and thus light enough to allow the waterwheel to be rotated even when the amount of falling water is small, and, when the circular members loaded in the respective curved portions reach a top dead center thereof, the circular members are filled with water before falling freely to continuously rotate the latch.

Technical Solution

In accordance with an aspect of the present invention, there is provided a hydroelectric power generation system including: a waterwheel having multiple curved portions formed at predetermined intervals in a rotational direction thereof, the waterwheel being rotated by falling water; multiple circular members each having a cover, the circular members each being loaded in a corresponding one of the multiple curved portions, elevated with the cover in an open position to empty the circular member, filled with water upon reaching a top dead point thereof, and allowed to fall freely with the cover in a closed position; a cover opening/closing means for automatically opening/closing the cover of the circular member; a track extending in a downwardly inclined manner from a point at which the curved portion of the waterwheel is turned into a downwardly inclined position, the track guiding the circular member leaving the curved portion to move by gravity along the track; a feed track disposed in a downwardly inclined manner at an end of the track and allowing the circular members returned from the waterwheel to be sequentially supplied back to respective curved portions along the feed track during rotation of the waterwheel; multiple support members supporting the track and the feed track; and a generator driving means disposed on the track and generating power as the circular members filled with water sequentially fall down along the track such that a generator produces electricity, wherein the generator is connected to an output shaft of a gear train to be driven by the gear train amplifying torque generated by a latch rotated by the circular member circulating along the track and the feed track due to rotation of the water wheel.

Advantageous Effects

The hydroelectric power generation system according to the present invention has several advantages over the conventional apparatus as follows:

First, when the circular member is loaded in the curved portion of the waterwheel to be elevated, the cover of the circular member is opened to empty and lighten the circular member, whereby transfer of the circular member can be achieved even when the amount of falling water is small. When the circular member reaches a top dead center thereof, the circular member is filled with water and then the cover is closed. Then, the circular member falls freely along the track under acceleration due to gravity and rotates the latch. Then, the hook of the latch continuously moves the chain connected between the driving sprocket and the driven sprocket to drive the generator. Accordingly, the hydroelectric power generation system according to the present invention can ensure stable electricity generation even in the dry season.

Second, the hydroelectric power generation system according to the present invention can eliminate the need for a separate auxiliary drive unit and controller, thereby reducing installation cost.

BEST MODE

Figure 1:
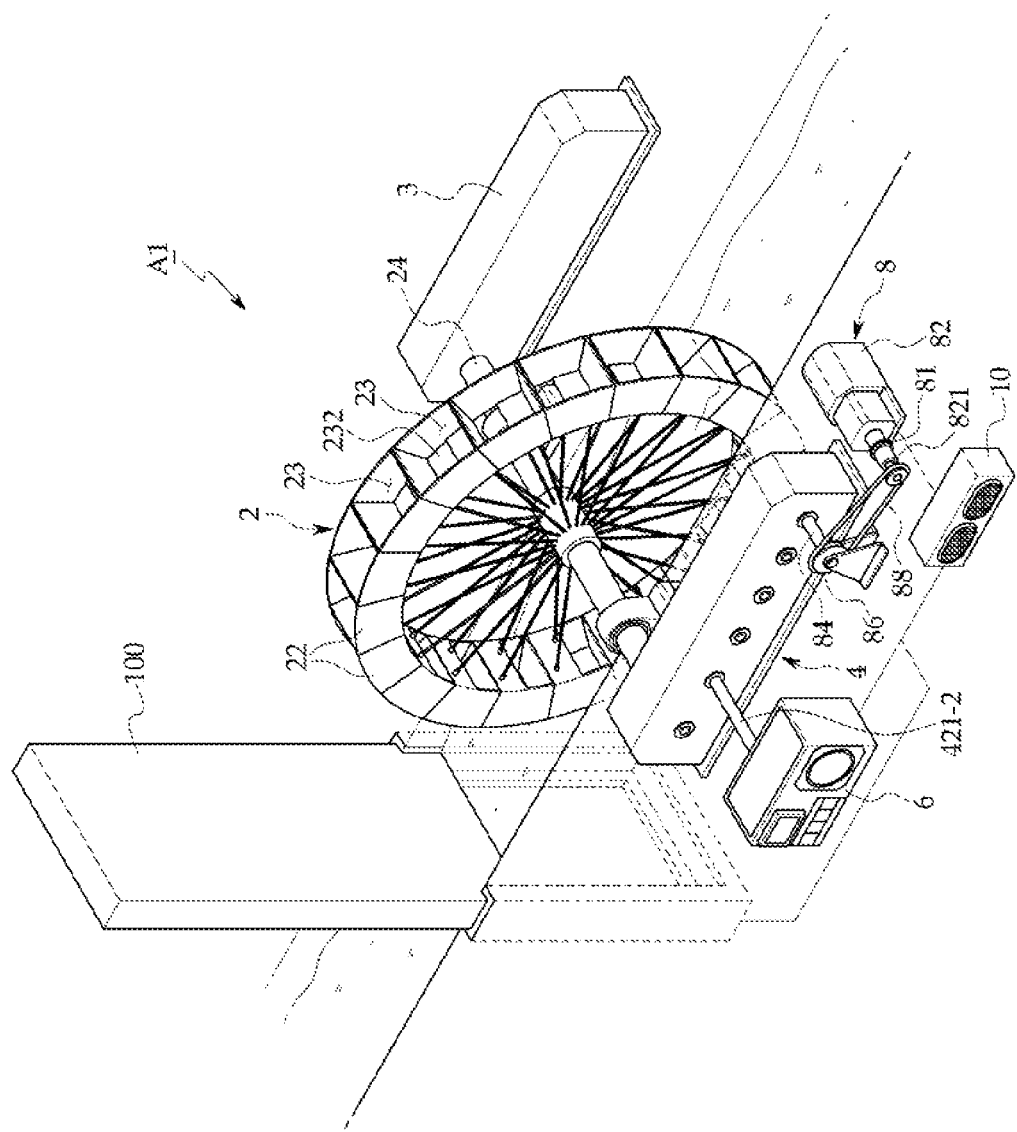
FIG. 1 is a perspective view of a conventional rotary power generation apparatus using a waterwheel.
Figure 2:
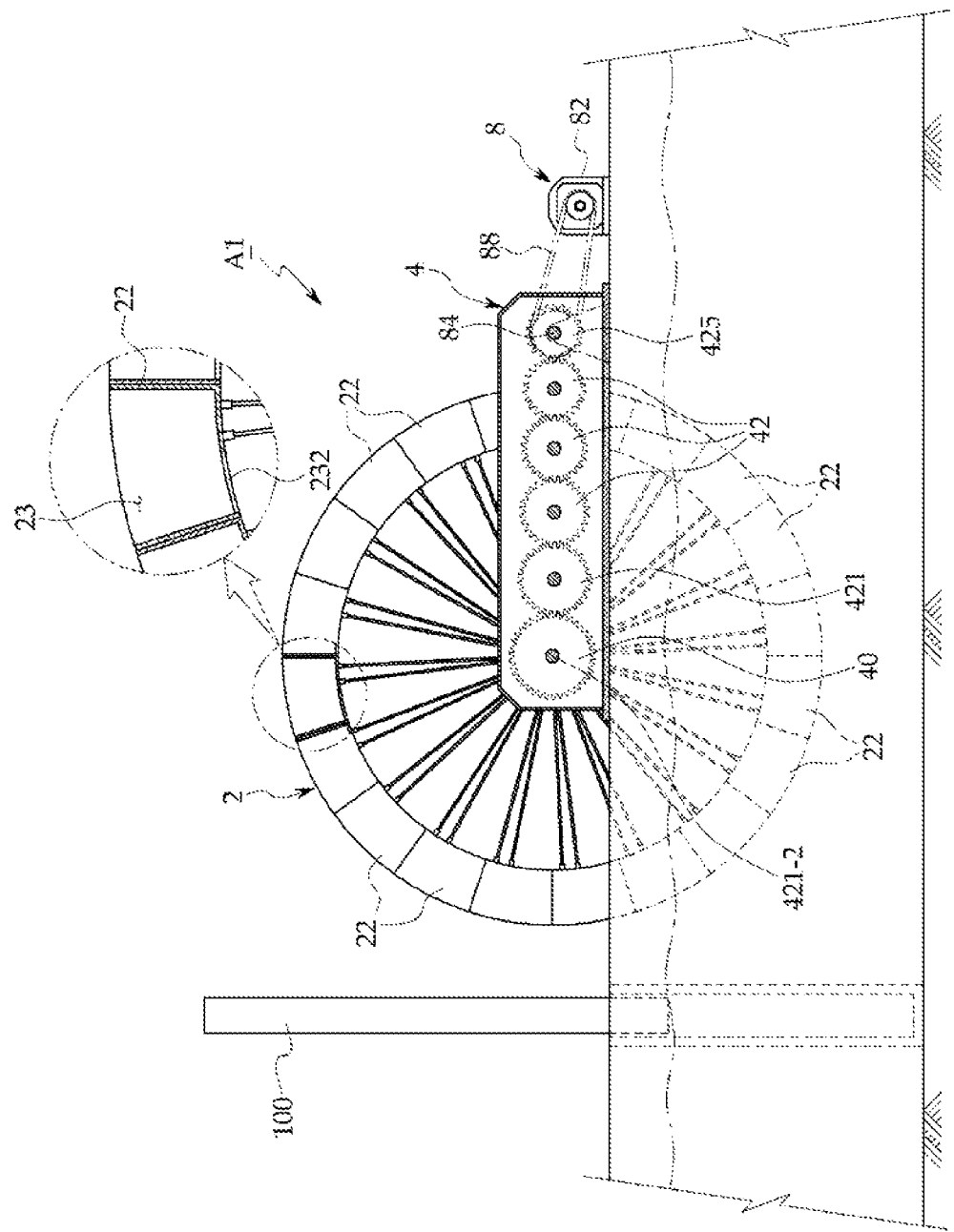
FIG. 2 is a front view of the conventional rotary power generation apparatus using the waterwheel.

Hereinafter, embodiments of the present invention will be described with reference to the accompanying drawings such that the present invention can be easily implemented by those skilled in the art. It should be understood that the present invention may be embodied in different ways and is not limited to the following embodiments. It should be noted that all the drawings are diagrammatic and not drawn to scale. In the drawings, relative dimensions and proportions of parts may be exaggerated or reduced in size for the sake of clarity and convenience. Accordingly, the drawings are to be regarded as illustrative in nature and not as restrictive. In addition, it should be noted that like structures, elements, or components will be denoted by like reference numerals throughout the specification and the accompanying drawings.

Figure 3:
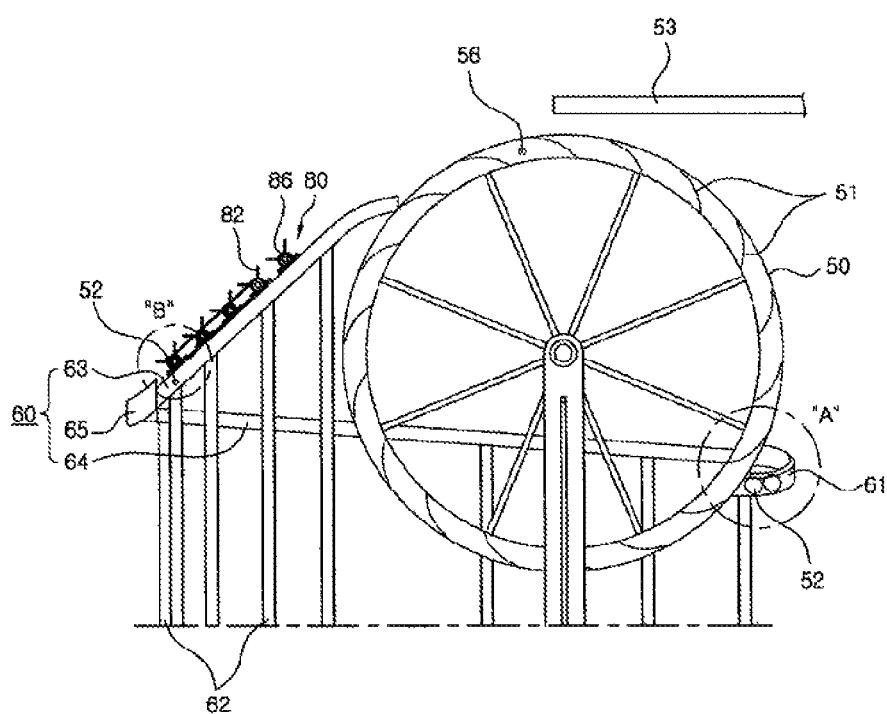
FIG. 3 is a side view of a hydroelectric power generation system according to one embodiment of the present invention.
Figure 4:
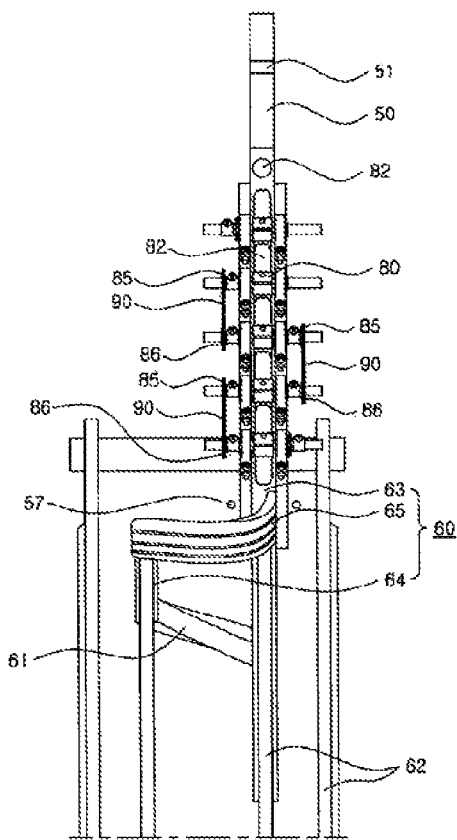
FIG. 4 is a front view of the hydroelectric power generation system of FIG. 3.
Figure 5:
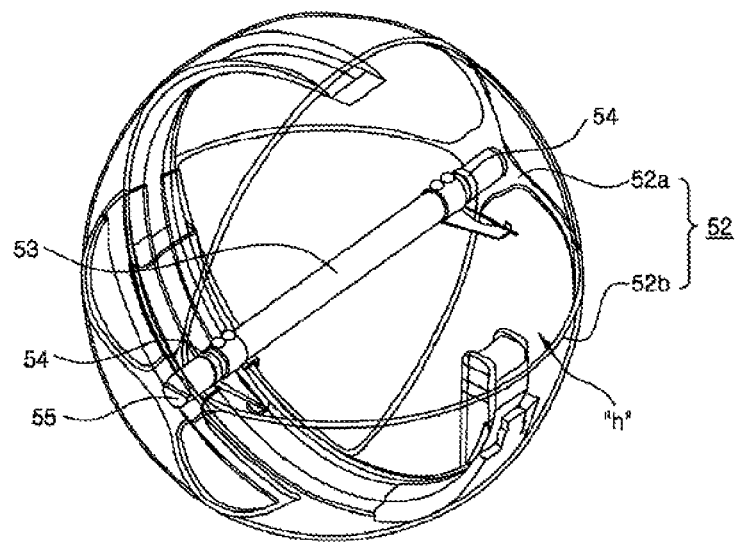
FIG. 5 is a perspective view of a circular member according to the present invention.

FIG. 3 is a side view of a hydroelectric power generation system according to one embodiment of the present invention, FIG. 4 is a front view of the hydroelectric power generation system of FIG. 3, and FIG. 5 is a perspective view of a circular member according to the present invention. In the hydroelectric power generation system according to the present invention, multiple curved portions 51 are formed at predetermined intervals on a waterwheel 50 in a rotational direction of the waterwheel, such that a circular member 52 is loaded in a corresponding one of the curved portions 51 and falls freely onto a track 60 as the waterwheel 50 is rotated by falling water from a water channel 53 disposed above the waterwheel 50.

Referring to FIG. 5, the circular member 52 includes: a main body 52a having an opening h; and a cover 52b secured to a shaft 53 rotatably mounted inside the main body 52a, wherein the cover 52b is adapted to open/close the opening h of the main body 52a while rotating in conjunction with rotation of the shaft 53. Accordingly, the circular member 52 is automatically opened/closed by a cover opening/closing means described below depending on a location of the circular member 52.

It will be understood that the size of the circular member 52 loaded and transferred in the curved portion 51 may be appropriately changed depending on the capacity of a generator 70 described below.

The track 60, onto which the circular member 52 falls freely, extends in a downwardly inclined manner from a point at which each of the curved portions 51 formed on the waterwheel 50 is turned into a downwardly inclined position, and a feed track 61 is disposed in a downwardly inclined manner at an end of the track 60, as shown in FIG. 3, such that the circular members 62 returned from the waterwheel are sequentially supplied to respective circular members 62 along the feed track 60 during rotation of the waterwheel 50. Here, the track 60 and the feed track 61 are supported by a plurality of support members 62.

Although the track 60 may be formed in one piece, in consideration of convenience of manufacturing and construction, in one embodiment of the present invention, the track 60 may be divided into: a first track 63 linearly disposed in a downwardly inclined manner at a circular member 52 discharge side of the waterwheel 50; a second track 64 linearly disposed in a downwardly inclined manner to be connected to the feed track 61 disposed at an entry side of the waterwheel 50; and a connection track 65 disposed at a joint between the first track 63 and the second track 64 to redirect the circular member 52, as shown in FIG. 3 and FIG. 4.

The cover opening/closing means, which is adapted to open/close the cover 52b of the circular member 52, includes: a torsion spring 54 wrapped around both ends of the shaft 53 and having one end secured to the main body 52a and the other end secured to the cover 52b; a motor 55 secured to one end of the shaft 53; a first sensor 56 allowing power to be applied to the motor 55 by detecting that the circular member 52 loaded in the curved portion 51 of the waterwheel 50 reaches a top dead center thereof; and a second sensor 57 disposed on the track 60 and allowing the motor 55 to be stopped by detecting that the circular member 52 has rotated a latch 80.

The motor 55 secured to one end of the shaft 53 is a DC motor and is waterproofed, and each of the first sensor 56 and the second sensor 57 detects the circular member 52 by sensing the motor 55 inside the circular member 52, which is formed of metal. In addition, the motor 55 is provided therein with a controller (not shown) adapted to turn the motor 55 on/off in response to the first and second sensors 56, 57 detecting the circular member 52.

It will be understood that, when the main body 52a is closed with the cover 52b, it is possible to prevent leakage of water filled in the circular member 52.

In addition, the first track 63 of the track 60 is provided with a generator driving means adapted to generate power as the circular members 52 filled with water are sequentially moved down along the track 60, thereby allowing the generator 70 described below to produce electric power.

Figure 8:
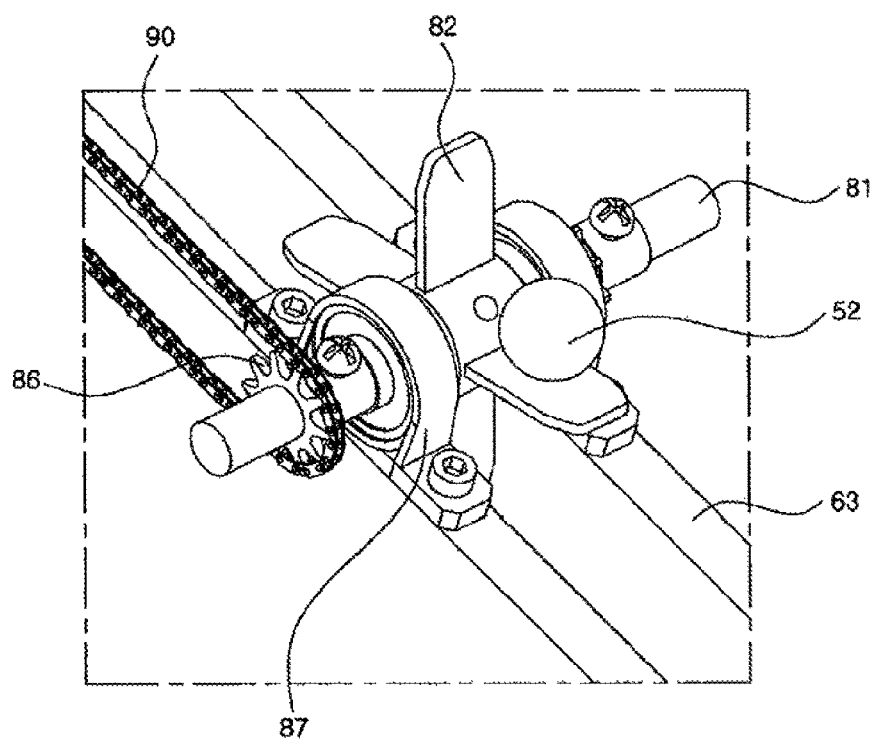
FIG. 8 is a perspective view of section "B" of FIG. 3.

Referring to FIG. 3, FIG. 4, and FIG. 8, a generator driving means according to one embodiment of the present invention includes: multiple shafts 81 disposed at predetermined intervals on the first track 63 and each rotatably mounted on a shaft support 87; and a latch 80 secured to each of the shafts 81 to be located inside the first track 63, wherein the latch 80 has a plurality of movable pieces 82 formed on an outer peripheral surface thereof to ensure that the latch 80 is rotated when the circular member 52 passes over the movable pieces 82.

In addition, a driving sprocket 85 and a driven sprocket 86 are secured to ends of respective shafts 81 and a chain 90 is connected between the driving sprocket 85 and the driven sprocket 86.

Figure 9:
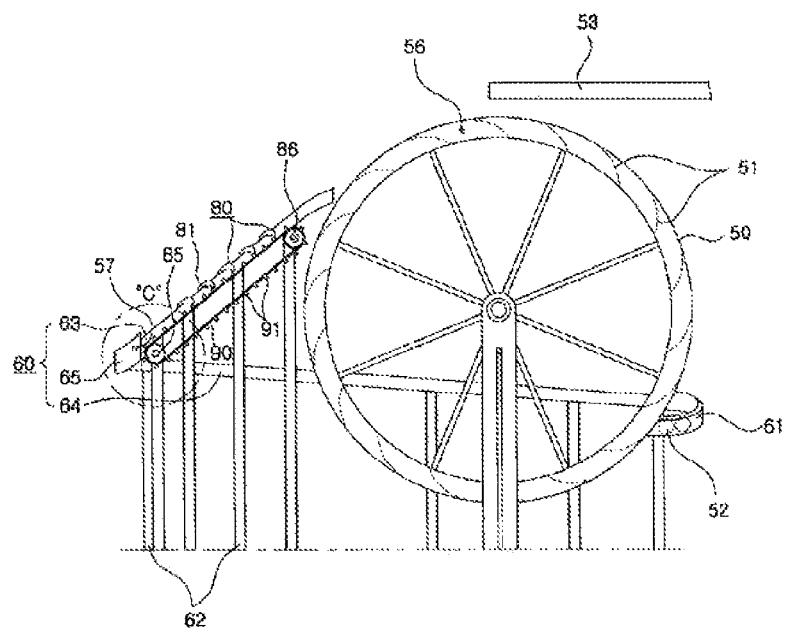
FIG. 9 is a side view of the hydroelectric power generation system according to the present invention, illustrating a generator driving means according to another embodiment of the present invention.
Figure 10:
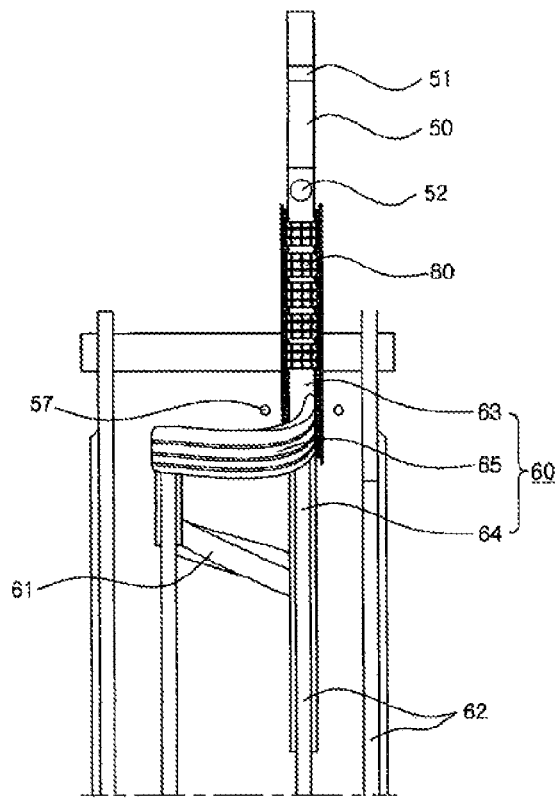
FIG. 10 is a front view of FIG. 9
Figure 11:
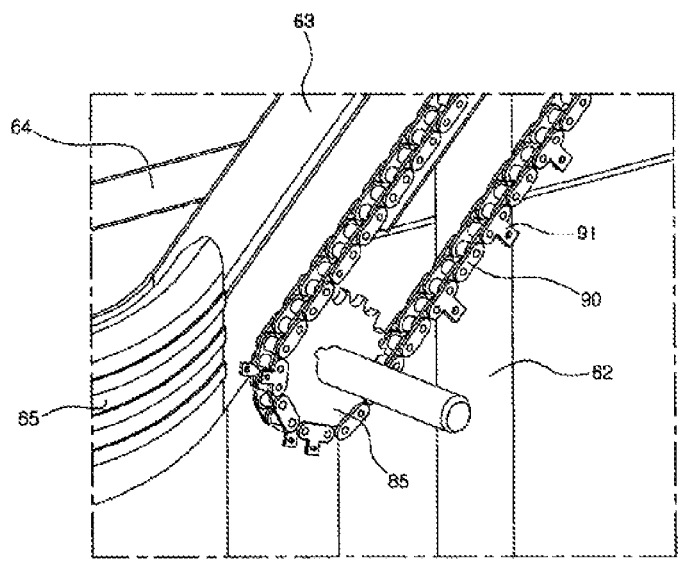
FIG. 11 is a perspective view of section "C" of FIG. 9.

Referring to FIG. 9 to FIG. 11, a generator driving means according to another embodiment of the present invention includes: multiple latches 80 disposed in a multistage manner and each rotated about a shaft 81, as shown in FIG. 9. It will be understood that the latch 80 may include: a movable piece 82 disposed inside the first track 63 and rotated about the shaft 81 by the circular member 52; and a hook 83 integrally formed with the movable piece 82 and disposed outside both sides of the track 60.

Here, since an outer peripheral surface of the latch 80 is repeatedly subjected to impact of the circular member 52 filled with water, the latch 80 preferably further includes ribs 84 formed in the outer peripheral surface thereof to reinforce strength.

In addition, a driving sprocket 85 and a driven sprocket 86 are disposed at opposite sides of the track 60 with a predetermined space therebetween, as shown in FIG. 9. The driving sprocket 85 is connected to the driven sprocket 86 via a chain 90 having multiple protrusions 91 formed at predetermined intervals thereon to catch the hook 83 of the latch 80.

Figure 12:
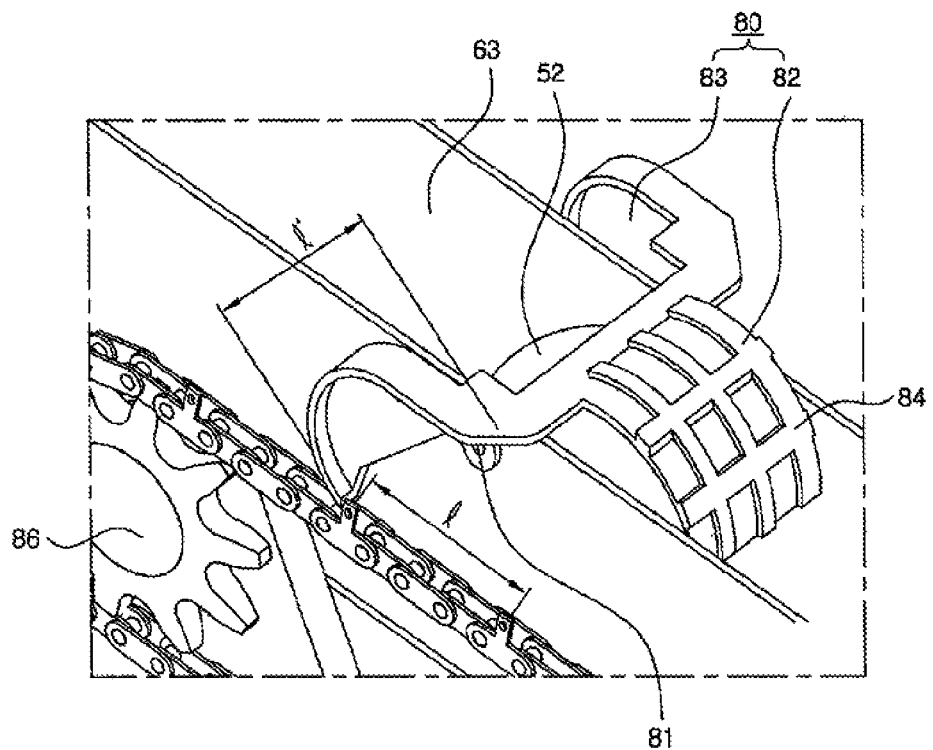
FIG. 12 is a perspective view of the generator driving means according to the other embodiment, wherein a hook of a latch is caught on a protrusion of a chain.

Here, a pitch (l) of the protrusions 91 formed on the chain 90 is set equal to an edge-to-edge distance (l') between the shaft 81 and the hook 83 of the latch 80, as shown in FIG. 12.

Figure 13:
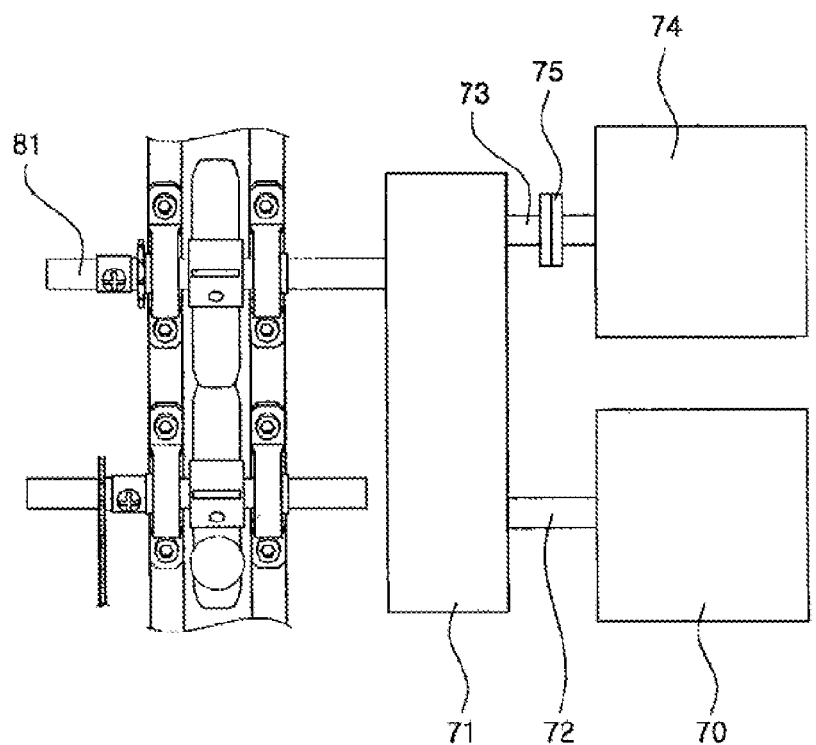
FIG. 13 is a plan view illustrating a motor connected to an output shaft of a gear train according to the present invention.

In addition, referring to FIG. 13, a known gear train 71 is disposed on the last shaft 81 to amplify the number of revolutions of the shaft and a generator 70 is connected to an output side of the gear train 71 via a common shaft 72.

The gear train 71 includes multiple spur gears having gradually smaller diameters to rotate the generator 70 at high speed through amplification of input torque. Since such configuration of the gear train 71 is well known in the related art, detailed illustration and description thereof will be omitted.

In the present invention, in order to minimize a load of the power generation system during initial operation thereof, a motor 74 is preferably connected to an output shaft 73 of the gear train 71 via a clutch 75 such that the gear train 71 is driven by the motor 74 for a preset period of time.

Accordingly, when the circular members 52 fall freely in succession along the track 60 due to rotation of the waterwheel 50, centrifugal force is applied to the driving sprocket 85, thereby reducing the load of the power generation system.

Now, operations of the power generation system according to the present invention will be described in more detail.

First, before rotation of the waterwheel 50, a plurality of circular members 52 having a predetermined size is on standby on the feed track 61. At this time, since there is no power applied to the motor 55, the cover 52b is released from the main body 52a by restoring force of the torsion spring 54 and the opening h is thus in an open position. Accordingly, the circular member 52 has no water therein and is thus light.

Accordingly, even when the amount of water falling from the water channel 53 is small, the waterwheel 50 can be rotated due to minimization of a load applied to the waterwheel 50.

When the waterwheel 50 is rotated counterclockwise (in the drawings) by falling water, the circular members 52 being on standby on the feed track 61 are sequentially loaded one by one into respective curved portions 51. Then, the circular member 52 loaded in the curved portion 51 is elevated without being separated from the waterwheel 50 until reaching a point at which the curved portion 51 is in a downwardly inclined position (a free fall point).

As described above, when the circular member 52 loaded in the curved portion 51 reaches the top dead center thereof, the circular member 52 with the opening h being in the open position is filled with water since a space between the curved portions is full of water. Here, in response to detection of the circular member 52 by the first sensor 56 disposed on both sides of the waterwheel 50, the controller embedded in the motor 55 applies power to the motor, thereby rotating the shaft 53.

Figure 6A:
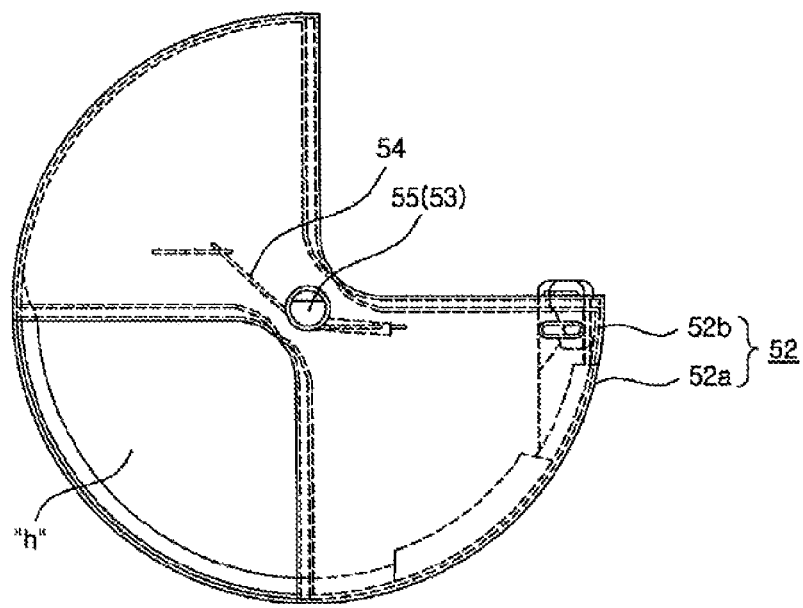
FIG. 6*a* is a view of the circular member, wherein an opening of a main body of the circular member is opened by restoring force of a torsion spring
Figure 6B:
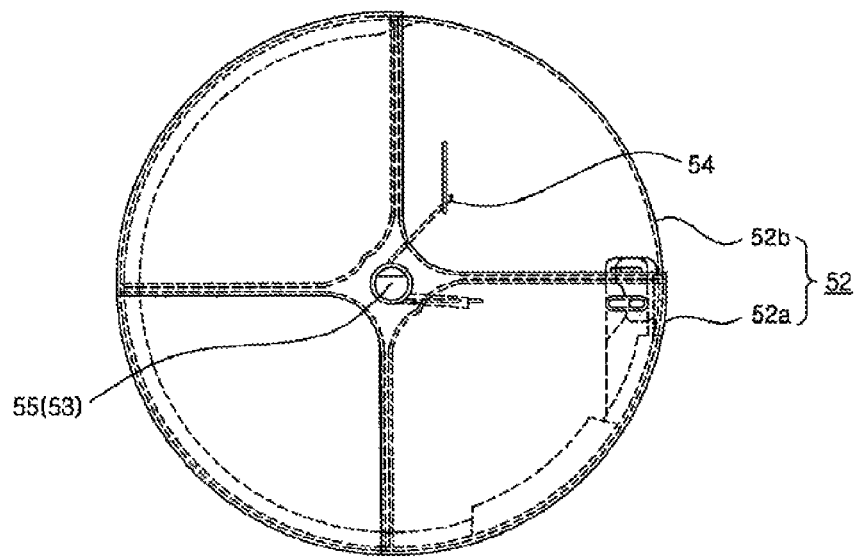
FIG. 6*b* is a view of the circular member, wherein the circular member is filled with water and the opening is closed by a cover driven by a motor.
Figure 7:
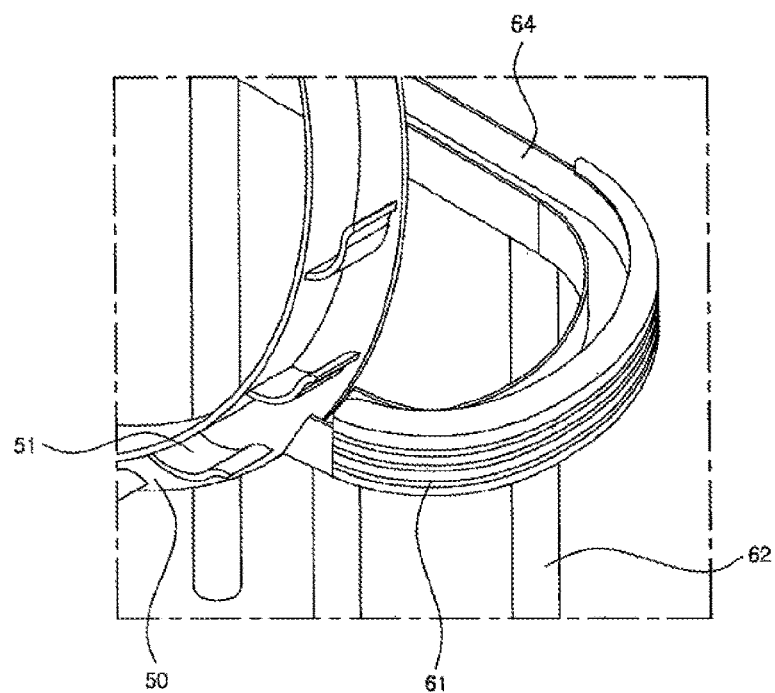
FIG. 7 is a perspective view of section "A" of FIG. 3, with a side wall of the waterwheel removed.

As a result, the torsion spring 54 wrapped around the shaft 53 and having opposite ends secured to the main body 52a and the cover 52b is compressed, such that the cover 52b is closed, as shown in FIG. 6b.

After the circular member 52 loaded in the curved portion 51 of the waterwheel 50 reaches the top dead center thereof and is filled with water, the circular member 52 reaches the free fall point as the waterwheel 50 continues to be rotated by falling water. Then, the circular member 52 is released by gravity from the curved portion 51 and is then moved along the track 60. Here, since the circular member 52 is full of water, the weight of the circular member 52 is increased due to acceleration due to gravity, whereby the circular member 52 passes over a first latch 80 on the first track 63 at high speed.

In the embodiment of the present invention as shown in FIG. 4, when the first latch 80 is rotated about a shaft 81 thereof as the circular member 52 passes over the movable piece 82 of the first latch 80, torque of the first latch is transmitted to the next shaft 81 through the chain 90. Such an operation occurs in succession as the circular member 52 sequentially passes over the latches 80 disposed in a multistage manner.

In the embodiment of the present invention as shown in FIG. 12, the hook 83 integrally formed with the movable piece 82 pushes a corresponding one of the multiple protrusions 91 formed at predetermined intervals on the chain 90 such that the chain 90 connected between the driving sprocket 85 and the driven sprocket 86 is moved by one pitch, causing the driving sprocket 85 and the driven sprocket 86 to rotate. Such an operation occurs in succession as the circular member 52 sequentially passes over the latches 80 disposed in a multistage manner.

After the circular member 52 passes over the movable piece 83, the latch 80 having been rotated about the shaft 81 by the circular member 52 is returned to an initial position thereof due to a center of gravity thereof and then stays idle until the next circular member 52 reaches the latch 80.

When the driving sprocket 85 is rotated due to the operation as described above, the gear train 71 amplifies the torque of the driving sprocket 85 to drive the generator 70.

When the second sensor 57 disposed at the entrance of the track 60 detects the circular member 52 falling out of the curved portion 51 of the waterwheel 50 and having rotated the latch 80, the controller shuts off power to the motor 55, such that the cover 52b is opened by restoring force of the torsion spring 54, as shown in FIG. 6a, and water is thus discharged from the circular member 52 through the opening h.

The circular member 52 with water discharged therefrom is moved by gravity to the downwardly inclined feed track 61 through the first track 63, the connection track 65, and the second track 64 to be on standby. As the waterwheel 50 continues to be rotated, the circular member 52 being on standby is automatically supplied to the curved portion 51 of the waterwheel 50 along the downwardly inclined feed track 61. Accordingly, during rotation of the waterwheel 50 by falling water, the circular member 52 filled with water rotates the latch 80 while falling down at high speed along the track 60 due to acceleration due to gravity.

Accordingly, the generator 70 is driven by the torque generated by rotation of the latch 80 and having been amplified by the gear train 71, thereby producing electric power.

When power is transmitted to the gear train 71 through the chain 90 as the circular members 52 fall down in succession, the gear train 71 is operated with a load thereof minimized by operation of the motor 74. Accordingly, it will be understood that power consumption can be reduced by blocking power transmission from the motor 74 to the gear train 71 using the clutch 75 while stopping operation of the motor 74.

Although some embodiments have been described herein, it will be understood by those skilled in the art that the embodiments described herein may be embodied in a variety of other forms without departing from the spirit and scope of the present disclosure.

Therefore, it should be understood that these embodiments are provided for illustration only and are not to be construed in any way as limiting the present invention, that the scope of the present invention is defined by the appended claims rather than the detailed description herein, and that all modifications, changes, and alterations conceivable from the appended claims and equivalents thereto are construed as falling within the scope of the present invention.

<List of Reference numerals>

| | |
|---|---|
| 50: Waterwheel | 51: Curved portion |
| 52: Circular member | 52a: Main body |
| 52b: Cover | 54: Torsion spring |
| 55: Motor | 56, 57: First and second sensors |
| 60: Track | 61: Feed track |
| 62: Support member | 63: First track |
| 64: Second track | 65: Connection track |
| 70: Generator | 71: Gear train |
| 74: Motor | 75: Clutch |
| 80: Latch | 82: Movable piece |
| 83: Hook | 85: Driving sprocket |
| 86: Driven sprocket | 90: Chain |
| 91: Protrusion | |

The invention claimed is:

1. A hydroelectric power generation system comprising:
a waterwheel having multiple curved portions formed at predetermined intervals in a rotational direction thereof, the waterwheel being rotated by falling water;
multiple circular members each having a cover, the circular members each being loaded in a corresponding one of the multiple curved portions, elevated with the cover thereof in an open position to empty the circular member, filled with water upon reaching a top dead point thereof, and allowed to fall freely with the cover in a closed position;
a cover opening/closing means for automatically opening/closing the cover of the circular member;
a track extending in a downwardly inclined manner from a point at which the curved portion of the waterwheel is turned into a downwardly inclined position, the track guiding the circular member leaving the curved portion to move by gravity along the track;
a feed track disposed in a downwardly inclined manner at an end of the track and allowing the circular members returned from the waterwheel to be sequentially supplied back to respective curved portions along the feed track during rotation of the waterwheel;
multiple support members supporting the track and the feed track; and
a generator driving means disposed on the track and generating power as the circular members filled with water sequentially fall down along the track such that a generator produces electricity,
wherein the generator is connected to an output shaft of a gear train to be driven by the gear train amplifying torque generated by the generator driving means actuated by the circular member circulating along the track and the feed track due to rotation of the water wheel.

2. The hydroelectric power generation system according to claim 1, wherein the generator driving means comprises:
multiple shafts arranged at predetermined intervals on a first track and rotatably mounted on respective shaft supports;
multiple latches secured to respective shafts to be located inside the first track, the latches each having multiple movable pieces formed on an outer surface thereof such that the latch is rotated when the circular member passes over the movable pieces; and
a driving sprocket and a driven sprocket secured to ends of respective shafts and having a chain connected therebetween.

3. The hydroelectric power generation system according to claim 1, wherein the generator driving means comprises:
multiple latches disposed in a multistage manner on the track to be rotatable about respective shafts, the latches each having a movable piece located inside the track and a hook located outside both sides of the track, wherein, when the circular member passes over the movable piece, the latch is rotated and then is returned to an initial position thereof due to weight of the movable piece;
a driving sprocket and a driven sprocket disposed at opposites sides of the track with a predetermined space therebetween; and
a chain connected between the driving sprocket and the driven sprocket and having multiple protrusions formed at predetermined intervals on an outer peripheral surface thereof to catch the hook of the latch.

4. The hydroelectric power generation system according to claim 1, wherein:
the circular member comprises a main body having an opening and a cover secured to a shaft rotatably mounted inside the main body, the cover being rotated in conjunction with rotation of the shaft to open/close the opening of the main body; and
the cover opening/closing means comprises a torsion spring wrapped around both ends of the shaft and having one end secured to the main body and the other end secured to the cover and a motor secured to one end of the shaft, the motor being driven in response to a first sensor and a second sensor detecting the circular member.

5. The hydroelectric power generation system according to claim 1, wherein the track comprises:
a first track linearly disposed in a downwardly inclined manner at a circular member discharge side of the waterwheel;
a second track linearly disposed in a downwardly inclined manner to be connected to the feed track disposed at an entry side of the waterwheel; and
a connection track disposed at a joint between the first track and the second track and redirecting the circular member.

6. The hydroelectric power generation system according to claim 1, further comprising:
a motor connected to the output shaft of the gear train via a clutch, the motor driving the gear train for a preset period of time during initial operation of the hydroelectric power generation system.

* * * * *